B. F. CORNELIUS.
WASHING OR COOKING BOILER.
APPLICATION FILED MAY 11, 1912.
1,051,558.
Patented Jan. 28, 1913.
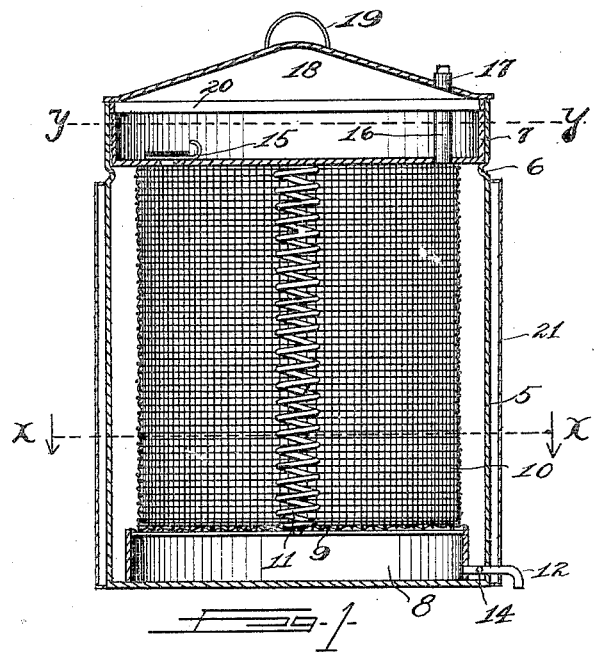
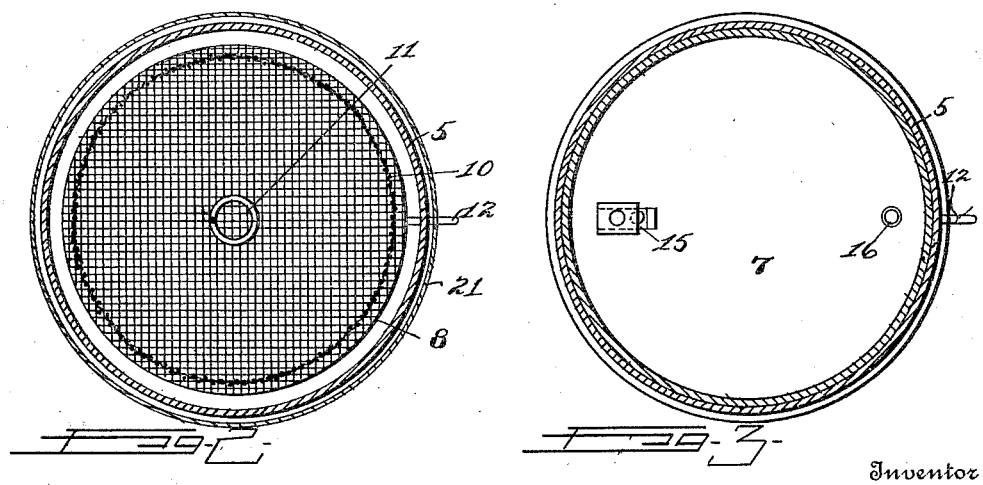
Witnesses
James N. Lyles
C. L. Schmidt
Inventor
Benjamin F. Cornelius,
By Shepherd & Campbell
Attorney

UNITED STATES PATENT OFFICE.

BENJAMIN F. CORNELIUS, OF DAVIS, OKLAHOMA.

WASHING OR COOKING BOILER.

1,051,558.  Specification of Letters Patent.  Patented Jan. 28, 1913.

Application filed May 11, 1912. Serial No. 696,690.

*To all whom it may concern:*

Be it known that I, BENJAMIN F. CORNELIUS, citizen of the United States of America, residing at Davis, in the county of Murray and State of Oklahoma, have invented certain new and useful Improvements in Washing or Cooking Boilers, of which the following is a specification.

This invention relates to washing or cooking boilers, the object of the invention being to provide an improved device of this character constructed in such manner that it may be used for washing clothes, or for steaming and cooking food stuffs when it is desired to can them.

Further objects and advantages of the invention will be set forth in the detailed description which now follows.

In the accompanying drawing Figure 1 is a vertical sectional view of a device constructed in accordance with the invention. Fig. 2 is a horizontal section therethrough upon line X—X of Fig. 1, and Fig. 3 is a horizontal sectional view upon line Y—Y of Fig. 1.

Like numerals designate corresponding parts in all of the figures of the drawing.

Referring to the drawing, the numeral 5 designates a substantially cylindrical casing, having an annular inwardly directed rib 6. This rib supports a water pan 7. A ring 8, forming a lower water chamber, is seated upon the bottom of casing 5, and is covered by a screen fabric 9. A screen cylinder 10 is disposed within casing 5 and rests upon screen 9 and extends upwardly to the underside of water pan 7. A wire spiral 11 is disposed centrally within the screen cylinder 10 and serves a function hereinafter set forth. A faucet 12 leads from the lower portion of the lower water chamber, and this faucet opens into the interior of ring 8, and is provided with an additional opening 14, whereby said faucet serves to drain dirt and dirty water from the interior of ring 8 and also from the lower portion of the space between ring 8 and casing 5. Water pan 7 is provided at its bottom with a valve indicated at 15 and a vent pipe 16 carried by said pan permits the steam generated in the lower portion of casing 5 to pass to the upper side of pan 7. If desired, an additional vent pipe 17 may be provided in a cover 18, which is provided with a handle 19 and a flange 20, said flange fitting within the upper portion of the casing 5. Vent pipe 17 may be provided with a removable plug by means of which plug said pipe may be closed at will. The operation of the device is as follows:— When used as a washing machine, the lower portion of the casing is filled with water, and the clothes to be washed are placed within the screen cylinder 10, said screen cylinder 10 spacing them from the side walls of casing 5 and the screen 9 spacing them from the bottom of casing 5. The spiral 11 maintains a central open passage through the clothes and permits a flow of steam and water upwardly through the center of the clothes and back down through the clothes, thereby causing a precipitation of the dirt from the clothes and thoroughly cleansing them. After the clothes have been steamed for ten minutes, or thereabout, the faucet 12 is opened and the dirty water allowed to escape. The faucet is then closed and valve 15 is opened, permitting the water from the water pan 7 to flow downwardly through the clothes, and to take the place of the water that has been discharged, the water in the water pan having been heated during the steaming of the clothes. The water pan is then filled, preparatory to again repeating this action, if desired. If desired, a jacket indicated at 21 may be secured in position about the casing 5, this jacket providing a hot air space which prevents loss of heat by radiation, and renders the device more economical in use.

While this device is particularly adapted for use in cleansing clothes, it is also adapted for use as a cooker to steam food products.

While the elements shown and described are well adapted to serve the purposes for which they are intended, it is to be understood that the invention is not limited to the precise construction set forth, but includes within its purview, such changes as may be made within the scope of the appended claim.

Having described my invention, what I claim is:—

In a device of the character described, the combination with an inclosing casing, of a lower annular member located therein and spaced from the side walls thereof, said annular member having a horizontal screen top, a screen cylinder vertically disposed within said casing, said screen cylinder being slightly smaller in diameter than said annular member, and said screen cylinder having its lower end resting loosely upon said horizontal screen top, a water pan supported by the wall of the casing and located adjacent the top thereof, said screen cylinder terminating at the under side of said water pan, a wire spiral disposed centrally and loosely within the screen cylinder with its lower end resting upon the screen top and with its upper end resting against the underside of said water pan, and a controlling valve for controlling the passage of water from said water pan to the interior of the screen cylinder.

In testimony whereof I affix my signature in presence of two witnesses.

BENJAMIN F. CORNELIUS.

Witnesses:
A. K. SUGGS,
H. A. GAGE.